(12) United States Patent
Lodde et al.

(10) Patent No.: US 11,020,931 B2
(45) Date of Patent: Jun. 1, 2021

(54) MANUALLY TEARABLE WOVEN ADHESIVE TAPE WITH HIGH ABRASION RESISTANCE AND NOISE DAMPING, AND METHOD OF MAKING SAME

(71) Applicant: Coroplast Fritz Müller GmbH & Co. KG, Wuppertal (DE)

(72) Inventors: Christoph Lodde, Holzwickede (DE); Gülay Wittig, Bochum (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 445 days.

(21) Appl. No.: 14/689,177

(22) Filed: Apr. 17, 2015

(65) Prior Publication Data

US 2015/0298422 A1    Oct. 22, 2015

(30) Foreign Application Priority Data

Apr. 22, 2014  (DE) .................... 10 2014 105 609.4

(51) Int. Cl.
*B32B 3/02*   (2006.01)
*B32B 7/12*   (2006.01)
(Continued)

(52) U.S. Cl.
CPC ............... *B32B 3/02* (2013.01); *B32B 3/00* (2013.01); *B32B 3/28* (2013.01); *B32B 3/30* (2013.01);
(Continued)

(58) Field of Classification Search
CPC ........ B32B 2307/402; B32B 2307/554; B32B 5/024; D10B 2505/00; Y10T 442/3472
(Continued)

(56) References Cited

U.S. PATENT DOCUMENTS

2011/0067799 A1* 3/2011 Mussig .................. A61L 15/58
156/94
2016/0168427 A1* 6/2016 Lodde ........................ C09J 7/04
428/220

FOREIGN PATENT DOCUMENTS

CN    2876090 Y    3/2007
CN    1946822 A    4/2007
(Continued)

OTHER PUBLICATIONS

EP 2631278, as machine translated Aug. 2017.*
(Continued)

*Primary Examiner* — Vincent Tatesure
(74) *Attorney, Agent, or Firm* — Dickinson Wright PLLC

(57) ABSTRACT

A highly abrasion-resistant technical adhesive tape rolled into an adhesive tape roll includes a strip-shaped double-layer substrate with a pressure-sensitive adhesive coating on one side. The substrate includes a first fabric layer, and a second fabric layer firmly connected to each other over the entire surface by an adhesive connection layer. An adhesive tape of this type acts in a noise-damping manner and is easily processable both manually and by machine because the fabric of the first textile layer and the fabric of the second textile layer each have a basis weight of 50 g/m² to 300 g/m². The adhesive connection layer has a basis weight of 50 g/m² to 300 g/m². The adhesive tape has a thickness (D) of at least 0.5 mm. At least one tape edge has a pattern deviating from a straight line formed by a separating process.

31 Claims, 3 Drawing Sheets

(51) Int. Cl.
  *B32B 37/12* (2006.01)
  *B32B 5/02* (2006.01)
  *B32B 27/18* (2006.01)
  *B32B 7/00* (2019.01)
  *B32B 27/30* (2006.01)
  *B32B 5/00* (2006.01)
  *B32B 3/30* (2006.01)
  *B32B 7/02* (2019.01)
  *B32B 3/00* (2006.01)
  *B32B 27/12* (2006.01)
  *B32B 27/06* (2006.01)
  *B32B 27/32* (2006.01)
  *B32B 3/28* (2006.01)

(52) U.S. Cl.
  CPC ............... *B32B 5/00* (2013.01); *B32B 5/02* (2013.01); *B32B 5/022* (2013.01); *B32B 7/00* (2013.01); *B32B 7/02* (2013.01); *B32B 7/12* (2013.01); *B32B 27/06* (2013.01); *B32B 27/12* (2013.01); *B32B 27/18* (2013.01); *B32B 27/30* (2013.01); *B32B 27/308* (2013.01); *B32B 27/32* (2013.01); *B32B 37/12* (2013.01); *B32B 2255/02* (2013.01); *B32B 2262/00* (2013.01); *B32B 2262/0276* (2013.01); *B32B 2262/0284* (2013.01); *B32B 2305/188* (2013.01); *B32B 2307/54* (2013.01); *B32B 2307/546* (2013.01); *B32B 2307/718* (2013.01); *B32B 2307/75* (2013.01); *B32B 2405/00* (2013.01)

(58) Field of Classification Search
  USPC ............... 442/343, 268, 239, 255, 261, 293; 428/193; 174/72
  See application file for complete search history.

(56) References Cited

FOREIGN PATENT DOCUMENTS

| | | | |
|---|---|---|---|
| CN | 101840750 A | 9/2010 | |
| DE | 43 18 277 C1 | 9/1994 | |
| DE | 4318277 C1 | 9/1994 | |
| DE | 202005013009 U1 | 10/2005 | |
| DE | 10 2012 202 635 A1 | 8/2013 | |
| DE | 2631278 A1 * | 8/2013 | ............... C09J 7/04 |
| DE | 202012103975 U1 * | 2/2014 | ............... C09J 7/04 |
| DE | 102013108917 A1 | 4/2014 | |
| EP | 2230737 A1 | 9/2010 | |
| EP | 2631278 A1 | 8/2013 | |
| GB | 2191969 A | 12/1987 | |
| WO | 2005/085379 A1 | 9/2005 | |

OTHER PUBLICATIONS

European Search Report dated Jul. 18, 2017.
Chinese Notification of First Office Action and English translation from corresponding Chinese application No. 201510323219.X dated Dec. 13, 2017 (14 pgs).

* cited by examiner

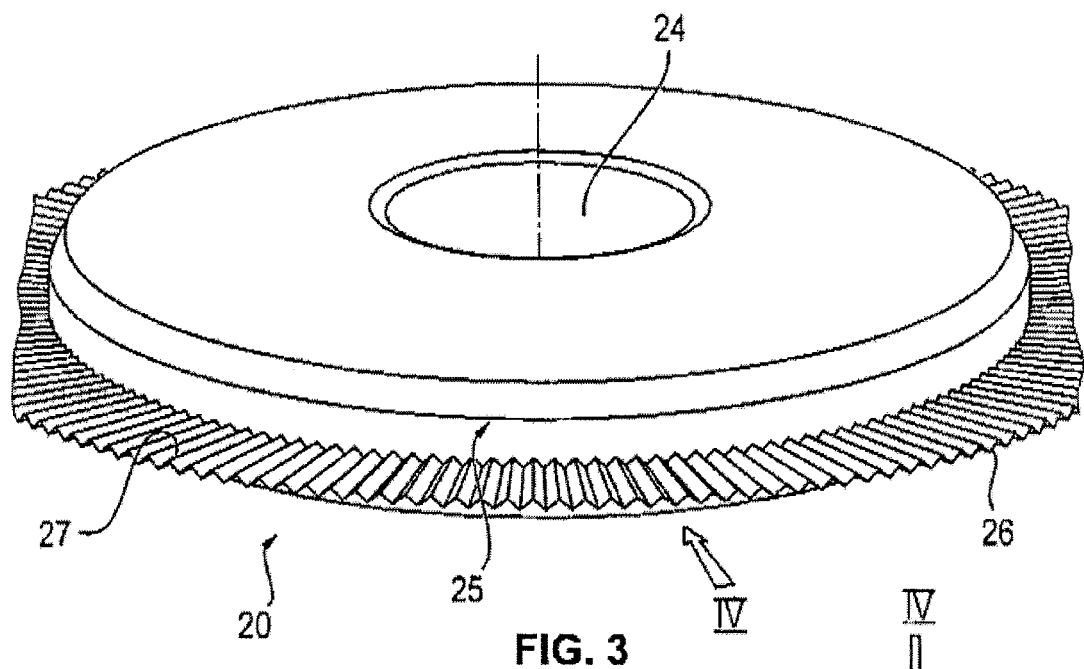
FIG. 3
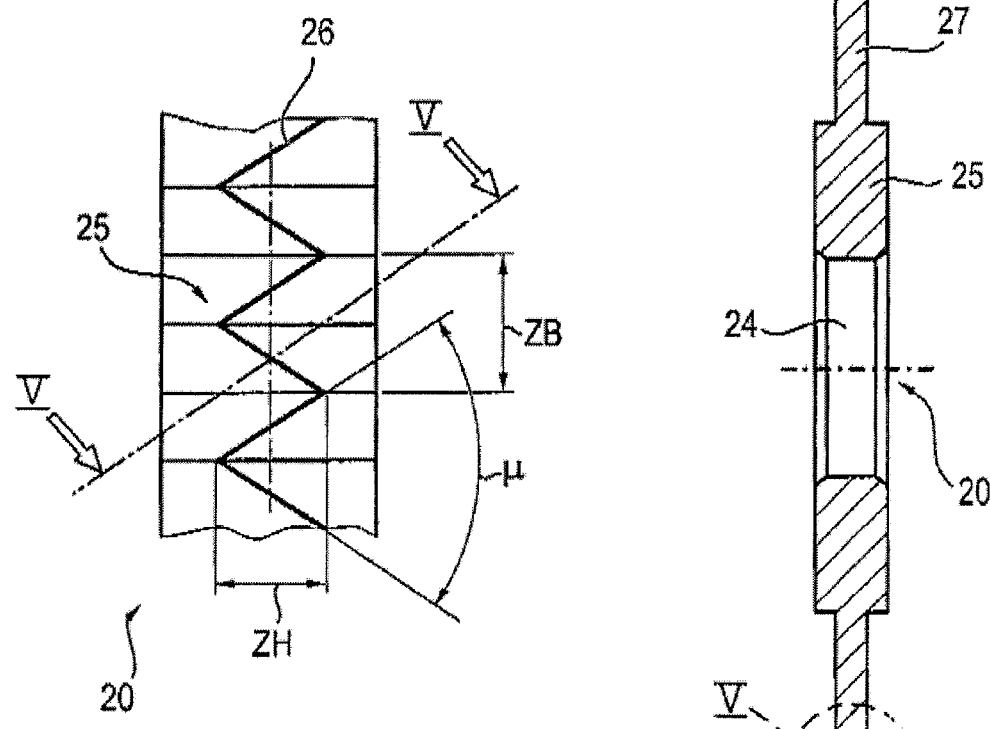
FIG. 4
FIG. 5

MANUALLY TEARABLE WOVEN ADHESIVE TAPE WITH HIGH ABRASION RESISTANCE AND NOISE DAMPING, AND METHOD OF MAKING SAME

CROSS REFERENCE TO RELATED APPLICATIONS

The present patent document claims the benefit of priority to German Patent Application No. 10 2014 105 609.4, filed Apr. 22, 2014, and entitled "Handeinreißbares Gewebeklebegand mit hoher Abriebfestigkeit und Geräuschdämpfung und Verfahren zu seiner Herstellung," the entire contents of each of which are incorporated herein by reference.

BACKGROUND

The invention relates to a highly abrasion-resistant technical adhesive tape, in particular one which is rollable onto itself into an adhesive tape role, preferably a cable winding tape, including a double-layer band-type substrate, which is provided on one side with a pressure-sensitive adhesive layer, wherein the substrate comprises a first textile layer comprised of a fabric and second textile layer which are fixed to each other full-surface by an adhesive connection layer.

The invention further relates to a method for manufacturing an adhesive tape of this type.

In the automotive sector, cable sets are often wrapped with adhesive tapes, wherein mainly textile adhesive tapes, in addition to the pure bundling function, have also assumed numerous additional functions, such as the protection of the lines from abrasion or the damping of rattling- or vibration noises. Here the use of both fabric adhesive tapes and various non-woven adhesive tapes is widespread.

The different requirements imposed on adhesive tapes are in part contrary to one another with respect to certain basic parameters of the adhesive tape, such as, e.g., the thickness. Thus—assuming other basic parameters, such as the substrate material, remain constant—in an adhesive tape with increasing thickness, although having a higher abrasion resistance and noise damping, a limited flexibility and a deterioration of hand-tearability as well as of flagging behavior is also to be expected.

The testing of adhesive tapes for the wrapping of cable sets is mostly effected in the automobile industry according to extensive standards, such as are summarized, for example, in LV 312 "Adhesive tapes for cable sets in motor vehicles" (1/2005) as common inspection guidelines of the companies Audi, BMW, DC, and VW.

Thus the abrasion resistance is determined according to LV 312 based on DIN ISO 6722 by first applying the adhesive tape to a mandrel (metal rod) having a diameter of 5 or 10 mm. Using a scraping tool that has a needle diameter of 0.45 mm, the number of strokes that are needed, under a weight force of 7 N, to wear through the adhesive tape is then determined. With respect to abrasion resistance, the classification provided in LV 312 is reproduced in the following Table 1.

TABLE 1

| Classification of abrasion classes according to LV 312 | |
|---|---|
| Abrasion class | Requirement |
| A - no abrasion protection | <100 strokes |
| B - slight abrasion protection | 100-499 strokes |

TABLE 1-continued

| Classification of abrasion classes according to LV 312 | |
|---|---|
| Abrasion class | Requirement |
| C - moderate abrasion protection | 500-999 strokes |
| D - high abrasion protection | 1000-4999 strokes |
| E - very high abrasion protection | 5000-14999 strokes |
| F - extremely high abrasion protection | 15000-29999 strokes |
| G - abrasion protection for special applications | ≥30000 strokes |

With respect to noise damping, LV 312 provides the classification reproduced in the following Table 2.

TABLE 2

| Classification of noise damping classes according to LV 312 | |
|---|---|
| Noise damping class | Requirement |
| A - no noise damping | 0-2 db(A) |
| B - slight noise damping | >2-5 db(A) |
| C - moderate noise damping | >5-10 db(A) |
| D - high noise damping | >10-15 db(A) |
| E - very high noise damping | >15 db(A) |

In the mentioned guidelines, for example, testing methods for thermal resistance, compatibility of adhesive tapes with electrical vehicle lines and for chemical resistance, fogging- and flagging-behavior are described as further application-relevant tests. "Flagging" is understood here as meaning a loosening, in particular helically, of tape wrapped around a cable set, so that its ends protrude, and in order to avoid this, each end must be fixated in use.

In order to meet the different demands in practice, numerous technical solutions for adhesive tapes are known to the prior art, whereby generally special importance is attached to one, in part also to two or more of the required properties, whereas other properties are assigned less importance, a value range for these parameters thereby being tolerated which is actually not considered optimal.

An adhesive tape of the above-mentioned type is known from DE 20 2005 013 009 U1, which includes a textile substrate made from at least one fabric layer and a layer connected thereto formed in particular from a velour or fleece and an adhesive layer applied one- or two-sided to the substrate, wherein the fabric layer is configured as a fine-woven fabric layer having more than 25 threads/cm in the longitudinal and transverse directions. In addition to an advantageously high abrasion resistance, the known tape has, however, the disadvantageous properties that it is not machine-processable and shows a flagging on the cable set so that its ends much each be fixated in use. The above-mentioned tapes are also not hand-tearable.

A double-layer adhesive tape of the above-mentioned type is also known from WO 2005/085379 A1. In this document, in particular a highly abrasion-resistant and noise-dampening adhesive tape is described for the bandaging of cable harnesses, particularly in automobiles, which comprises a substrate including a first cover layer. The first cover layer is comprised of a velour, scrim, fabric, or knit, in particular made from a PET filament fabric or a polyamide fabric. The first cover layer is fixedly connected to a further layer, which is comprised of a porous fabric, such as a textile having an open but stable three-dimensional structure, or of a foam or a foamed film. This layer can have, in particular, in the sense of a desired high noise damping, a high basis weight of up to 500 g/m², in particular a preferred basis weight in the range of 150 to 300 g/m². The further layer can on the other hand be fixedly connected on its other side over its entire surface on its open side to an optionally present third layer designated as the second cover layer, which preferably—like the first cover layer—is comprised of a velour, scrim, fabric, or knit, in particular made from a PET filament fabric or a polyamide fabric. The surface fusion of the first cover layer, optionally the second cover layer, and the further layer connected to the first cover layer, or optionally also to the second cover layer, can be effected by using a laminating adhesive, or adhesive-free by mechanical bond formation such as meshing, overstitching, needling, or hydroentanglement. In one embodiment of the known tape, abrasion resistances according to ISO 6722 with a weight load of 10 N from more than 8,000 double strikes on a 10 mm mandrel were measured. It is also disadvantageous in this known tape that it is not mechanically processable and has a high band thickness. Adhesive tapes of this type are disadvantageously also not hand-tearable.

SUMMARY OF THE INVENTION

The object of the present invention is to provide an adhesive tape of the above-described type having a double-layer substrate, which with high abrasion resistance, in particular with an abrasion resistance according to class E according to LV 312, which is preferably determined on a 5 mm mandrel, is easily processable both manually and by machine and has hand-tearability. Here the inventive adhesive tape should also be pliant and flexible with the presence of a rot-proof substrate, show an improved flagging behavior compared to adhesive tapes according to the above-mentioned prior art, have a high adhesive strength, and fulfill at least the requirements of noise damping class B according to LV 312.

This is inventively achieved in that the second textile layer is comprised of a fabric wherein the fabric of the first textile layer and the fabric of the second textile layer each have a basis weight in the range of 50 g/m² to 300 g/m², wherein the adhesive connection layer has a basis weight in the range of 50 g/m² to 300 g/m², wherein the adhesive tape has a thickness of at least 0.50 mm, and at least one tape edge is embodied in the form of a pattern deviating from a straight line, which is structured using a separation process.

With the inventive adhesive tape, dispensing with a fabric layer connected to the first textile layer which is comprised of an open three-dimensional structure such as a fleece or a foam, and dispensing with a straight cutting edge with specified hand-tearability, a noise damping at least of class B, as well as excellent values of abrasion resistance, are thus achieved. In particular an abrasion resistance according to class E according to LV 312 is achieved.

With the same number of strokes achieved until the abrasion limit, here the abrasion resistance on the 5 mm mandrel is higher than on a 10 mm mandrel, since with a given abrasion resistance on such a mandrel the abrasion limit is reached sooner—i.e. already with a lower number of strokes—than on the 10 mm mandrel. It is thus possible that a fabric that achieves an abrasion resistance according to a certain class on a mandrel having a 10 mm diameter must be classified one class lower according to the test on the 5 mm mandrel. However, this is not the case with an inventive adhesive tape: the abrasion class E is achieved both on the 10 mm mandrel and on the 5 mm mandrel.

The inventive adhesive tape is significantly more supple than the above-described known adhesive tapes. Compared to these it has a lower tendency to flagging. Manual and mechanical processing are specified. The corresponding parameters fall in a range that is also characteristic for one-layer adhesive tapes.

The advantageousness of the invention is apparent in particular if the substrate is comprised of a rot-proof textile substrate, such as, for example, of a polyamide or polyester fabric, whereby in particular, in addition to the desired abrasion resistance, the required high tensile strength can be ensured. Due to these properties the inventive adhesive tape is very suitable for wrapping cable sets.

Here the inventive adhesive tape can have, in particular, a thickness in the range of 0.5 to 1.0 mm, preferably a thickness in the range from 0.55 mm to 0.75 mm.

Due to the pattern-structuring of one or, in particular both tape edges, which in the tape manufacturing can be executed by means of a separating process, here—even with an initially not hand-tearable substrate—a hand-tearability can nonetheless surprisingly be achieved in the transverse direction of the tape with this thickness.

It can be provided here in particular that both tape edges are configured as zigzag cut edges, which can be described by means of a tooth pattern with tooth tips, tooth flanks and tooth feet. Here the tooth height of the pattern can fall in the range from 0.1 mm (0.1 mm to <1.0 mm—microserrations) to 3.0 mm (1.0 mm to 3.0 mm—macroserrations), wherein outer warp threads lying in the vicinity of the tape edge are cut by the separation process in the region of the tooth flanks or at least scribed in the region of the tooth feet. The number of thereby weakened warp threads can fall in the range of >1 to 15, preferably in the range from 2 to 12, particularly preferably in the range from 6 to 11. The weft threads are shortened to different lengths by the separating process. For this purpose a serrated knife can be used, such as is known from DE 43 18 277 C1 for the use of polypropylene foils.

The manufacture of such an adhesive tape comprises the following steps:

1. Substrate Material Design

In particular for polyester fabric substrates, inventively preferred thread constructions having 45±3 warp threads and 25±3 weft threads can be used, wherein the use of preferred similar threads in warp and weft can also be seen as favorable with respect to an increased abrasion resistance.

Here the fineness of the warp threads can lie below 100 dtex, in particular at 56 dtex, and that of the weft threads at over 400 dtex, in particular at 557 dtex, wherein the fineness of the warp threads to the fineness of the weft threads is in a ratio that is considered optimal of 1:8-11, preferably of 1:10. Warp threads and weft threads here can preferably each be composed of a different number of filaments. In general here a number in the range of 24 to 144 filaments per thread is possible, however with an increasing number of filaments, it has to be assumed that there will be a reduction in abrasion resistance.

The use of textured threads also has the advantageous effect of increasing the abrasion resistance. In the textile industry "texturing" refers to a process by which the chemical fibers are permanently curled. With this processing, the synthetic filaments acquire a character similar to that of natural filaments and a textile feel. The texturing usually takes place under the influence of heat and pressure, whereby a thermoplasticity of the filaments is utilized. Due to a crimping of the filaments in the texturing, fiber loops are generated, which results in a volume increase, whereby the elastic stretchability increases while the thermal conductivity decreases.

In order to carry out the texturing, various, in particular mechanical, mechanical-thermal, and chemical thermal processes are known. Thus with the so-called false-twisting method a thread is twisted with up to 1000 turns/m and heat-fixed. After the winding back, a fixed spiral structure is retained in the individual filaments. In stuffer-box crimping a fiber bond is pressed through heated rollers into a chamber having walls disposed in a wedge shape and thereby compressed and crimped, whereby the crimping is fixed by the chamber heat. In jet texturing, a filament yarn is guided through a jet through which simultaneously compressed air is pressed. Upon exiting from the nozzle, the air swirls, thus partially releasing the yarn into its individual filaments and looping it again, whereafter a concluding stabilizing occurs in a fixing zone, which is also associated with hardening and shrinking.

Filament yarns, in particular polyester yarns, are commercially available in titer ranges from in particular 33 dtex to 660 dtex as flat yarn in various forms, thus as FDY—Fully Drawn Yarn or FOY—Fully Oriented Yarn, or as POY—Partially Oriented Yarn; but also textured: DTY—Drawn Textured Yarn. In the threads of the fabric which are used for forming the substrate, filaments of the various yarn forms can advantageously be combined. Thus in particular, as is also depicted in the special exemplary embodiment, weft threads can be comprised of any combination of FDY and DTY filaments, whereby the thread cohesion is increased, which is of importance in particular with thicker threads, i.e. threads of a higher fineness.

In addition, it can also advantageously also be provided that in the fabric of the first textile layer and/or in the fabric of the second textile layer the warp threads and/or the weft threads are respectively intermingled, wherein in particular 50 to 150 intermingling points per meter are present. The intermingling—also called interlacing—is an additional fitting of the filaments, wherein the filaments are selectively interwoven by a swirling with air. Here the cohesion of the individual filaments is not achieved by a turning but by an entangling of the filaments. The intermingling can be carried out with smooth threads, but it is also possible, and inventively preferred, to carry out an intermingling in direct connection with a texturing of the threads.

2. Selection of the Adhesive

Here the adhesive connection layer can advantageously be comprised of a hot-melt adhesive, in particular of a hot-melt adhesive that is predominantly comprised of an ethyl acrylate copolymer, such as an ethylene butyl acrylate or an ethylene-ethyl acrylate, or predominantly of an ethylene-vinyl acetate copolymer (EVA), wherein the respective copolymer is preferably modified with UV-crosslinkable acrylic hardeners and/or polymerized UV-C photo reactive groups, in particular in the side chain.

The adhesive contributes on the one hand to abrasion resistance; on the other hand a jet coating of the substrate and manufacturing of the inventive adhesive tape using conventional hot-melt coaters is possible, which are usually designed for dispersion- and solvent-based-adhesives.

3. Coating Method

The adhesive can be applied in particular in a pressureless coating method, such as the so-called "curtain-coating method." According to this method, a closed adhesive film falls on the substrate. In this way a uniform thickness and thus grammage of the adhesive layer is achieved. Only as much adhesive is applied as is absolutely necessary.

4. Coating of the Substrate Layers

In this way the basis weight of both the adhesive connection layer can inventively be precisely adjusted in the range from 50 to 300 g/m$^2$, as well as that of the adhesive layer preferably in the range from 50 g/m$^2$ to 300 g/m$^2$, especially from 55 g/m$^2$ to 150 g/m$^2$. The grammage of the adhesive connection layer and of the adhesive layer can be adjusted to the same size. In alternative product constructions, different adhesive applications of the adhesive connection layer and of the adhesive layer can also be set.

In particular it is also possible here to set a laminate adhesive force, considered optimal in the context of the invention, determined according to DIN EN 1939 (2003 edition) between the first textile layer and the second textile layer of the substrate to a value that is greater than 10 N/cm.

The bond using the mentioned hot-melt adhesive, compared to the use of the other mentioned adhesives, with increasing basis weight in the inventively claimed range, also results in an advantageously disproportionate increase in the abrasion resistance.

5. Lamination of the Substrate Layers

The lamination can occur inline or offline in a separate operation. The substrate material of the master roller, which is comprised of the laminate, is hand-tearable or not hand-tearable, depending on the material combination.

Here the manufacture of the inventive adhesive tape comprises a laminating of the fabric layers of the substrate onto each other; an application of the adhesive layer to at least one side of the laminate, whereby in particular after the laminating, the fabric or the adhesive tape, after the application of the adhesive layer, is still not transversely tearable; a winding into a parent roll of large width; and—in a concluding manufacturing step—the cutting of the parent roll into saleable commercial narrow rolls; whereby the parent roll is separated using a roll cutter. During this cutting the adhesive tape is provided with the edge structuring, in particular by the use of a zigzag knife, and is thus transversely tearable by hand.

6. Precutting of the Parent Rolls into Narrow Rolls

During the precutting of the parent rolls narrow rolls, the hand-tearability of the narrow role is optimized by the use of a suitable cutting process to the effect that after the cutting, the narrow rolls have a good-to-limited hand-tearability. This is achieved, for example, by using a roll cutter which is equipped with zigzag cross blades. Zigzag blades of this type have an edge structuring of a different type. In DE 10 2012 202 635 A1 the use of different zigzag blades, among other things also for one-layer fabrics, is described. For an adhesive tape it is required here that its substrate have a serrated cut that ends in a point, wherein this is extended by a cut starting at the point and extending in the medial direction.

Due to the intended edge damage, the hand-tearability is improved. In addition, the tensile strength can be intentionally reduced by the type of tape edge, which has the form of a pattern deviating from a straight line, said pattern being structured by the separating process wherein the tensile strength is reducible by up to 40% compared to an output value which is measured according to DIN EN 14410 on a material without edge structuring. Other adhesive tape properties, such as, e.g., breaking force, elongation at break, and tear propagation, are influenced by the zigzag edge cut.

There is also the possibility to use winding and cutting machines with blade burins for the manufacture of the narrow rolls.

Further advantageous design features of the invention are contained in the dependent claims as well as the following description. The invention is explained in more detail based on the inventive exemplary embodiment illustrated by the accompanying drawings and a comparative example.

BRIEF DESCRIPTION OF THE DRAWINGS

FIG. 3 shows a perspective view of a blade usable for manufacturing an inventive adhesive tape, FIG. 4 shows a view in the direction of the arrow IV in FIGS. 3 and 5 of a blade edge of a blade usable for manufacturing an inventive adhesive tape, FIG. 5 shows a cross section through a blade usable for manufacturing an inventive adhesive tape, wherein the periphery of the blade (detail V) is depicted cut-away such that this results from the line V-V in FIG. 4.

DETAILED DESCRIPTION OF THE DRAWINGS

Figure 1:
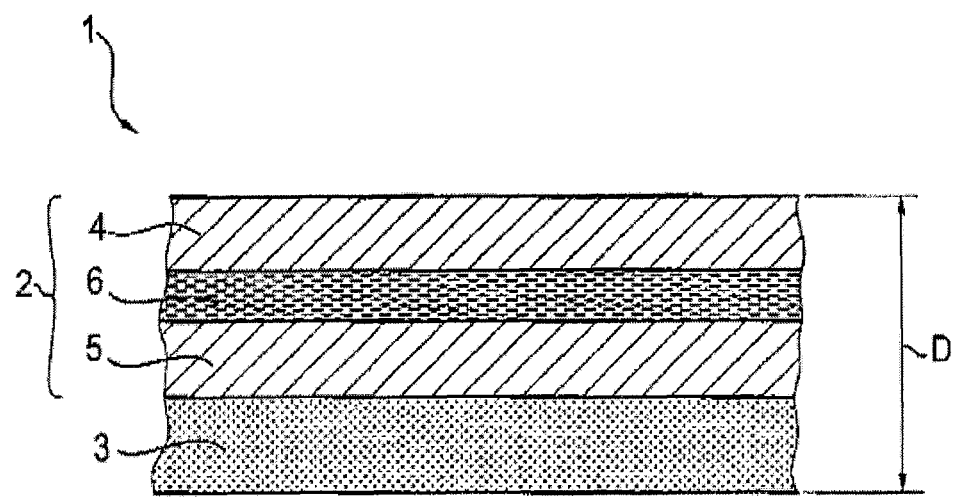
FIG. 1 shows an embodiment of an inventive adhesive tape in a cross-sectional view.

Regarding the following description, it is expressly emphasized that the invention is not limited to the exemplary embodiment, and thereby not to all or a plurality of features of described combinations of features. Rather, each individual partial feature of the exemplary embodiment, even in isolation from all other partial features described in this context, can in itself and in combination with any other features also have an inventive significance.

In the figures of the drawing, identical and mutually corresponding parts are also always provided with the same reference numbers, so that in general they are also each described only once.

As first illustrated in FIG. 1, an inventive highly abrasion-resistant technical adhesive tape 1, in particular a cable wrapping tape 1 for an automobile, windable on itself without interliner, comprises a band-shaped, double-layer substrate 2, which is provided on at least one side with a self-adhesive adhesive coating 3, which is comprised of a pressure-sensitive adhesive. Known adhesives are usable here as "pressure-sensitive adhesives," in particular UV-crosslinkable adhesives, wherein these require no further modification.

The substrate 2 comprises a first textile layer 4 comprised of a fabric and a second textile layer 5, which are fully fixedly connected to each other by an adhesive connection layer 6. It is inventively provided that both textile layers 4, 5, i.e. the first textile layer 4 and second textile layer 5, are comprised of a fabric wherein the fabric of the first textile layer 4 and the fabric of the second textile layer 5 each have a basis weight in the range of 50 $g/m^2$ to 300 $g/m^2$, preferably 110 $g/m^2$ to 200 $g/m^2$.

Figure 2:
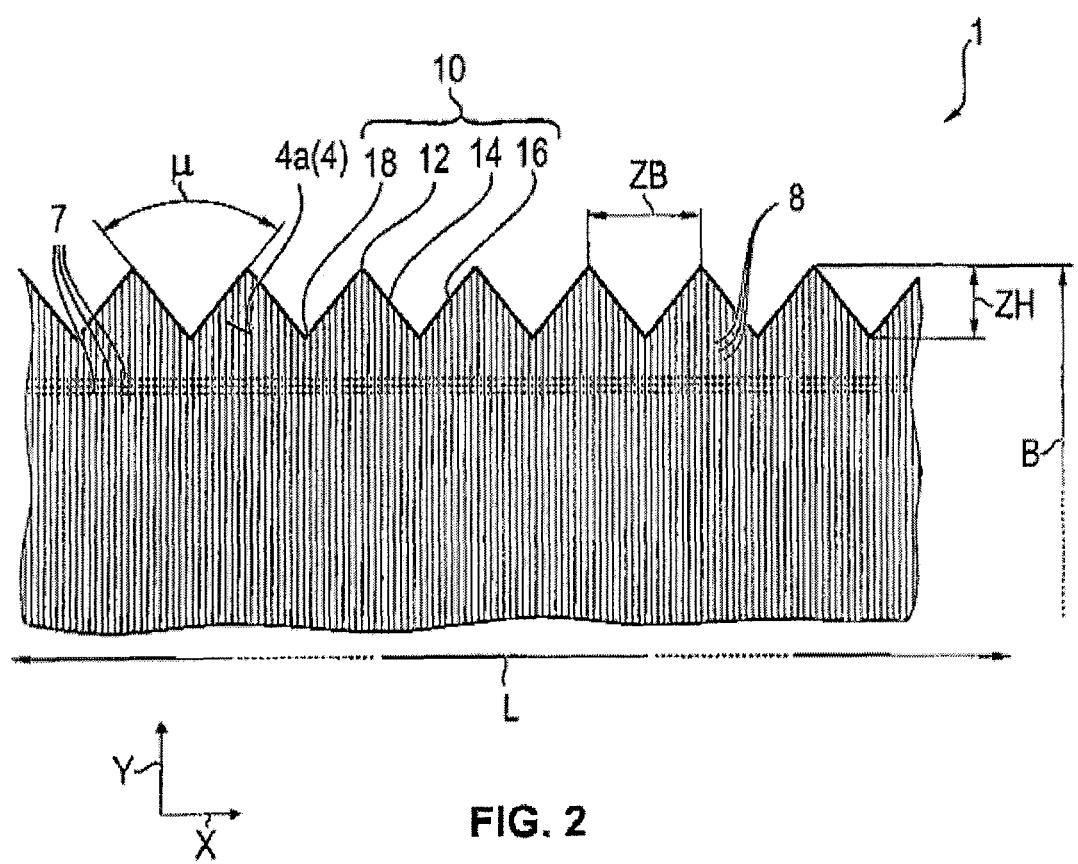
FIG. 2 shows a section of an embodiment of an inventive adhesive tape in plan view.

FIG. 2 shows a plan view of the surface 4a of the first textile layer 4, forming the tape back. In the figurative depiction here, the warp threads 7 extending in the tape longitudinal direction X and the weft threads 8 extending in the tape transverse direction Y of the fabric are visible.

Preferably the fabric of the second textile layer 5 can be the same fabric as in the first textile layer 4, in particular a fabric that is formed from polyester fibers comprised of up to 100 percent polyethylene terephthalate (PET). Such a fabric forms a rot-proof substrate 2 and can in particular in each case have a basis weight in the range from 50 $g/m^2$ to 300 $g/m^2$, preferably from 110 $g/m^2$ to 200 $g/m^2$.

The adhesive connection layer 6 inventively has a basis weight in the range from 50 to 300 $g/m^2$, wherein here values in the range from 55 $g/m^2$ to 150 $g/m^2$ are preferred, and values in the range from 80 $g/m^2$ to 120 $g/m^2$ are particularly preferred.

The adhesive connection layer 6 can in particular be comprised of an acrylate or acetate adhesive, preferably of a hot-melt adhesive as is also used for the manufacturing of the adhesive coating 3. Such a hot-melt adhesive can be manufactured based on an ethyl acrylate copolymer, such as an ethylene butyl acrylate or an ethylene-ethyl acrylate, or predominantly based on an ethylene-vinyl acetate copolymer, i.e. predominantly comprised of these polymers, wherein the polymers are preferably modified with UV-crosslinkable acrylic hardeners and/or can contain polymerized UV-C photo reactive groups, in particular in side chains.

The adhesive coating 3 can also have a basis weight in the range from approximately 50 $g/m^2$ to 300 $g/m^2$ with the preferred ranges specified for the adhesive connection layer 6. The application on the substrate 2 can be effected in a technologically advantageous manner by using the above-mentioned curtain-coating method.

The determination of the basis weight of the adhesive coating 3 and/or of the adhesive connection layer 6, as well as of the two textile layers 4, 5 comprised of fabric, is done here in the usual manner according to the standard DIN EN ISO 2286-2 "Rubber- or plastics-coated fabrics—Determination of roll characteristics—Part 2: Methods for determination of total mass per unit area, mass per unit area of coating and mass per unit area of substrate."

With a thickness D that is at least 0.50 mm, preferably with a thickness D in the range from 0.50 to 1.0 mm, especially preferably with a thickness in the range from 0.55 mm to 0.75 mm, the inventive adhesive tape 1 here achieves an abrasion resistance according to LV 312 of at least class E, in particular an abrasion resistance in the range from 5500 to 10,000 strokes, determined on a 5 mm mandrel.

Here the inventive adhesive tape is manually and mechanically processable and according to LV 312 advantageously has a temperature stability of 125° C. and more.

With a high suppleness and flexibility of the inventive adhesive tape 1, a bond strength between the first textile layer 4 and the second textile layer 5 of the substrate 2 can be set that is sufficient that during processing, in particular during a pulling-off from an adhesive tape roll, or even optionally during re-detachment from an unwound state, such as on a cable harness, a delamination of the layers 4, 5 does not result.

Here a laminate adhesive force, determined according to DIN EN 1939, between the first textile layer 4 and the second textile layer 5 of the substrate 2 is greater than 10 N/cm and preferably falls in the range from 12 N/cm to 15 N/cm, while an adhesive force determined according to DIN EN 1939 on the tape back 4a is less than the laminate adhesive force between the layers 4, 5 and in particular can fall in the range from 4.0 N/cm to 15.0 N/cm, preferably from 5.5 N/cm to 8.0 N/cm. Here an unwinding force determined according to DIN EN 1944 can in particular fall in the range from 2 N to 15 N, preferably in the range from 2 N to 9 N.

Here advantageously high adhesive forces are achievable using the inventive adhesive tape 1. Thus with a test according to DIN EN 1939 the adhesive force on steel can assume values in the range from 4.5 N/cm to 15.0 N/cm, preferably from 6.0 N/cm to 11.0 N/cm.

Typical preferred parameters of the fabric structure and the characteristics of the fiber material for a preferred embodiment of an inventive adhesive tape 1 are apparent in Table 3 below.

TABLE 3

Fabric structure and fiber material description

| Feature | Unit | Property/Value |
|---|---|---|
| Material of substrate 2 | — | Polyester fabric |
| Basis weight of 4, 5 | g/m² | per 155 |
| Fiber type | — | 100% polyester (PET) |
| Number of warp threads 7 | 1/cm | 45 |
| Yarn type warp threads 7 | — | Filament, intermingled/textured and spun-dyed |
| Filament count per warp thread 7 | Piece | 36 |
| Fineness of warp threads 7 | dtex | 56 |
| Fineness of warp threads 7 based on width B | dtex/cm | 2520 dtex/cm |
| Number of weft threads 8 | 1/cm | 23 |
| Yarn type weft threads 8 | — | Filament, intermingled/textured and spun-dyed |
| Filament count per weft thread 8 | Piece | Combination of 72 + 36 (total: 108 pieces) |
| Fineness of weft threads 8 | dtex | Combination of 334 + 223 (334 FDY yarn + 223 DTY yarn) |
| Fineness of weft threads 8 based on length L | dtex/cm | >11,000 dtex/cm |

With such fabrics as were used for both the first textile layer 4 and the second textile layer 5, in an inventive adhesive tape 1 the technical properties reproduced in Table 4 below can be achieved.

TABLE 4

Technical data of an inventive PET fabric composite adhesive tape 1 in comparison

| Test | Unit | Finding | Comparison |
|---|---|---|---|
| Thickness | mm | 0.50-0.58 | 1.0-1.1 |
| Elongation at break | % | 35-36 | 25-28 |
| Tensile strength | N/cm | 90-140 | 250-290 |
| Adhesive force | | | |
| steel | N/cm | 6.0-11.0 | 4.3-8.1 |
| tape backs 4a | N/cm | 2.0-6.0 | 3.0-6.9 |
| Unwinding force | N/19 mm | 3-7 | 3-7 |
| Flagging | | | |
| 30 min | mm | 0-1 | 0-1 |
| 24 h | mm | 0-1 | 0-1 |
| Abrasion 5 mm mandrel | strokes | 5500-8200 | 5300-6200 |
| Laminate adhesive force | N/cm | 12-15 | 6-8 |
| Noise damping | Class | B | E |
| Transverse tearability LV 312 | | yes | no |

The corresponding parameter values are compared to those of a conventional adhesive tape having a two-layer substrate made from a PET fabric layer and a fleece layer.

Regarding the inventive tape, the tensile strength is strongly dependent on how the material has been precut for use. Adhesive tapes that have been precut using a normal blade without edge networking have a tensile strength of >130 N/cm. Based on experience, these tapes are very difficult to tear transversely. With the so-called serrated production with micro- or macro-serrations, significantly lower tensile strengths are present. That is, with microserrations there is a tensile strength of approximately 125 N/cm. The tensile strength is termed "good." While on the other hand, with a macroserration the tensile strength is approximately 100 N/cm and the transverse tearability is termed "very good." For this purpose the following tables 4a and 4b are referred to, from which can be seen how the elongation at break, the tensile strength, and the tear propagation are influenced, i.e. can be set, by the respective precutting method.

TABLE 4a

| Test | Unit | Precutting trial 1 Straight blade | Precutting trial 2 Micro-serrated blade | Precutting trial 3 Macro-serrated blade |
|---|---|---|---|---|
| Elongation at break | % | 35 | 30 | 28 |
| Tensile strength | N/cm | 130 | 125 | 100 |
| Transverse tearability | LV 312 | difficult | easy | very easy |

TABLE 4b

| Test | Unit | Precutting trial 1 Straight blade | Precutting trial 2 Micro-serrated blade | Precutting trial 3 Macro-serrated blade |
|---|---|---|---|---|
| Tear propagation | mN | 10,000-12,000 | 8,000-10,000 | 5,000-8,000 |

The parameters contained in the above Tables are determined according to the norms and measurement methods specified in the following Table 5.

TABLE 5

| DIN standards | New reference | Date of current valid version | |
|---|---|---|---|
| EN ISO 2286-2 | | 1998 July | Basis weight |
| DIN 53830-3 | | 1981 May | Determining the fineness of yarns |
| DIN EN 1049-2 | | 1994 February | Determining the number of threads per length unit |
| DIN EN 1942 | | 2008 June | Thickness |
| DIN EN 14410 | | 2003 June | Breaking strength/elongation |
| DIN EN 1939 | | 2003 December | Adhesive force |
| DIN EN 1944 | | 1996 April | Unwinding force |
| DIN EN 21974 | DIN EN ISO 1974: 2012 September | 2012 September | Tear propagation resistance |
| DIN EN ISO 9237 | | 1995 December | Air permeability |
| DIN 53 362 | | 2003 October | Bending stiffness |
| LV 312 | LV 312-1 | 2009 October | Protection systems for cable sets in motor vehicles Adhesive tapes; Testing guidelines |
| LV 312 | LV 312-1 | 2009 October | Flagging |
| LV 312 | LV 312-1 | 2009 October | Hand-tearability |

The noise damping according to LV 312 specified in Table 4 of class B means that there is a noise damping in the range from 2 dB (A) to 5 dB (A) according to LV 312.

In addition to the above-mentioned high abrasion resistance, the inventive adhesive tape 1 also has high tensile strength, as expressed in values which fall in the range from 90 N/cm to 200 N/cm, preferably from 100 N/cm to 120 N/cm, in a test according to DIN EN 14410. The elongation at break, as indicated in Table 4, fell in the range from 30 percent to 40 percent. It should preferably be greater than 20 percent.

In view of the basis weights not listed in Tables 3 and 4 of the adhesive coating 3 and the adhesive connection layer 6 it is to be noted that in the depicted exemplary embodiment, both fall consistently in the range from 90 g/m² to 100 g/m². Nevertheless, the laminate adhesive force—determined according to DIN 1939—of the inventive adhesive tape 1 between the first textile layer 4 and the second textile layer 5 of the substrate 2 is greater than the adhesive force on the tape back 4a determined according to the same standard. This is necessary so that a pulling-off of the adhesive tape 1 from the roll does not result in a delamination of the layers 4, 5. Here the comparatively greater laminate adhesive force can be achieved by a stronger crosslinking of the adhesive in the adhesive connection layer 6, for example, due to a higher radiated power of a UV source used for this purpose, by a temperature elevated by 50° C. to 140° C. with respect to room temperature, or by a pressure increased by 0.05 bar to 6.0 bar with respect to atmospheric pressure during the laminating process of the textile layers 4, 5, or by a formula of the adhesive in the adhesive connection layer 6 deviating from the adhesive formula in the adhesive coating 3.

As mentioned above, adhesive for UV crosslinking is sold by the firm BASF SE under the trademark acResin®. The polymer chains of the acrylates contained in these adhesives are manufactured from the same acrylate monomers as are found in dispersion- and solvent-based acrylate pressure-sensitive adhesive systems. With an irradiation with UV-C light (250-260 nm), however, polymerized UV-C reactive groups are excited to crosslinking reactions with adjacent acrylate chains. Such a crosslinking here occurs very quickly but in a precisely controllable manner, and occurs only as long as the UV light is applied. The polymerized photoreactive groups of the polymer, in particular those located in side chains of the acResin®, react here with any C—H group of a neighboring chain. Thus arises the crosslinking structure characteristic of pressure-sensitive adhesives. A typical magnitude of the adhesive strength of an adhesive coating 3, which can be adjusted in this manner, is approximately 6 N/cm according to DIN 1939. By modifying such an acResin® adhesive with resin and/or sealable elastomers, relatively higher laminate adhesive forces can be set in the adhesive connection layer 6, in particular adhesive forces that are greater than 10 N/cm according to DIN 1939.

Deviating from the data specified for the exemplary embodiment, different adhesive forces—with the same or also with different adhesive formula—can of course also be set in the adhesive coating 3 and in the adhesive connection layer 6 by means of correspondingly differently selected adhesive grammages. Thus the application of adhesive in the adhesive layers 3, 6 can correspondingly be freely combined in the indicated ranges and preferred ranges, wherein in each case it can be ensured that the specified laminate adhesive force of more than 10 N/cm according to DIN 1939 is present in the adhesive connection layer 6.

It is seen as essential to the invention that at least one tape edge 10 of the inventive adhesive tape 1 is designed in the form of a pattern deviating from a straight line, said pattern being structured by means of a separating process, as is depicted in FIG. 2.

In the preferred embodiment depicted in FIG. 2 it is provided here that the tape edges 10 are configured as zigzag cut edges, which can be described by a tooth pattern having tooth tips 12, tooth flanks 14, 16, and tooth feet 18. Here a tooth height ZH between the tooth tips 12 and the tooth feet 18 of the pattern can fall in the range from 0.1 mm to 3.0 mm, preferably in the range from 0.5 mm to 2.0 mm, wherein outer warp threads 7 lying in the vicinity of the tape edge 10 are cut in the region of the tooth flanks 14, 16 or at least scribed in the region of the tooth feet 18. At each edge 10 the number of warp threads 7 so weakened can fall in the range from 3 to 12, preferably in the range from 5 to 7. The weft threads 8 are shortened only to different lengths by the separation process. All of the warp threads 7 of the first and second textile layers lying outside of the region of the tooth flanks 14, 16 and the region of the tooth feet 18 are continuous across a plurality of the tooth feet 18.

Figure 6:
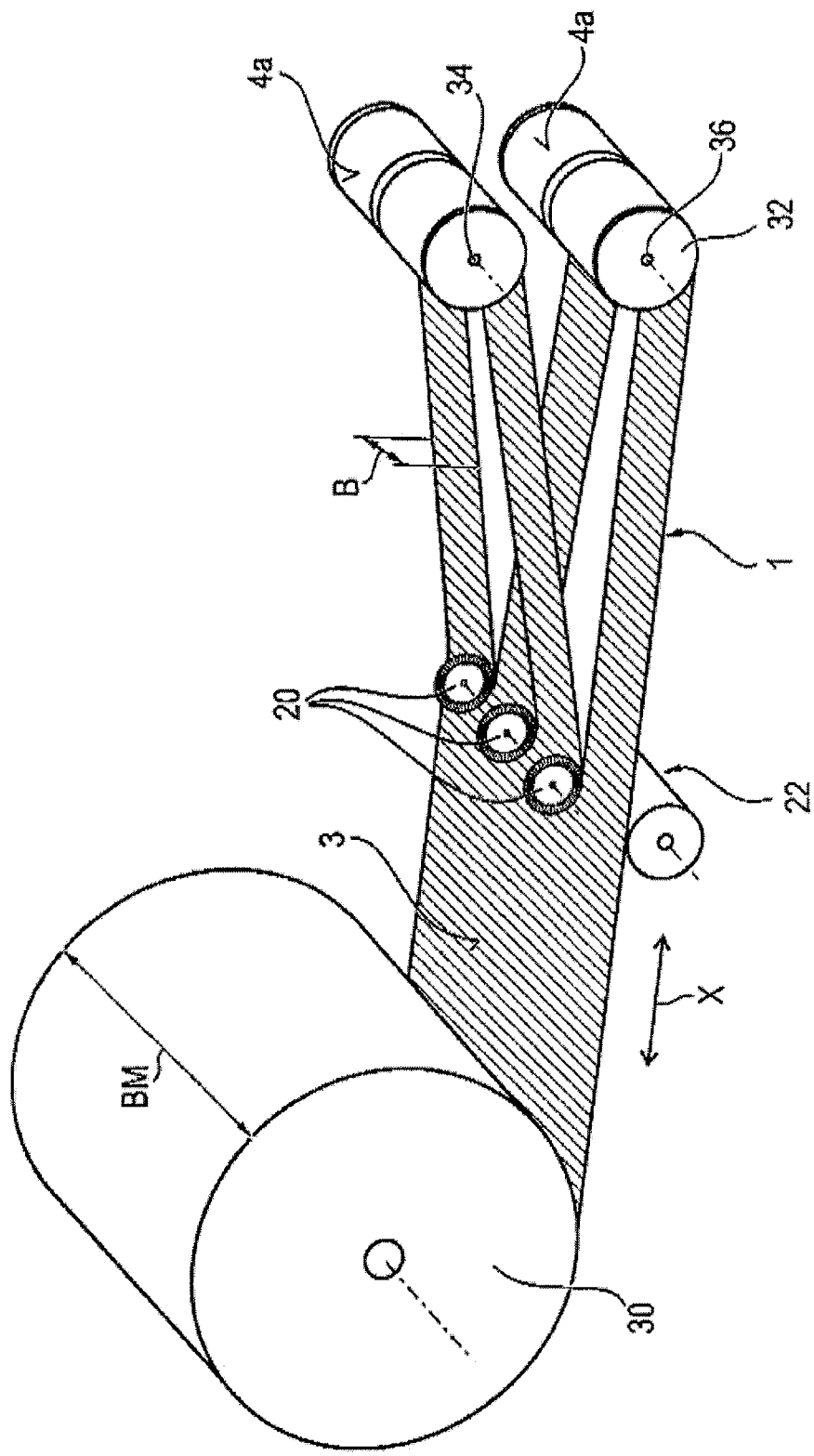
FIG. 6 shows a schematic perspective depiction for clarifying the inventive method step in the manufacture of an inventive adhesive tape.

In the manufacture of an inventive adhesive tape 1 a zigzag blade 20 can be used in particular as the tool for the separation process, as is depicted in FIGS. 3 to 5. FIG. 6 here illustrates this inventive method step in the manufacture of the inventive adhesive tape 1. Due to the use of the zigzag blade 20 the inventive adhesive tape 1 obtains the above-described structure of its edges 10 and is thus easily transversely tearable by hand.

Here the adjustable, disk-shaped zigzag blade 20 preferably used in the manufacture of the inventive adhesive tape 1 can be used on a shaft of a roller blade known as the separating device 22, as is schematically shown in FIG. 6, and includes for this purpose a central mounting opening 24 in its base body 25.

The zigzag blade 20 includes zigzag-shaped cutting edges 26 encircling its circumference, the preferred geometry of which cutting edges 26 can be seen in particular in FIG. 4. This geometry is reproduced during the separation in the tape edges 10 of the adhesive tape 1 and effects there the formation of the tooth pattern including the tooth tips 12, tooth flanks 14, 16 and tooth feet 18, as is depicted in FIG. 2. Accordingly the tooth height ZH between the tooth tips 12 and the tooth feet 18 of the pattern of the tape edges 10 is found again in the geometry of the cutting edge 26 of the zigzag blade 20 in FIG. 4, which can then also be dimensioned with the same dimensions. A tooth tip angle μ of the cutting edge 26 of the zigzag blade 20 here can fall in particular in the range from 42° to 70°, and a tooth foot width ZB can fall in the same range as the tooth height ZH, i.e. in a preferred range from 0.5 mm to 2.0 mm.

The inventive method for manufacturing the inventive adhesive tape 1 thus comprises the method steps of
Manufacturing a substrate 2 by laminating a fabric of a first textile layer 4 and a fabric of a second textile layer 5 using an adhesive connection layer 6,
Applying an adhesive coating 3 to at least one side of the laminate,
Winding onto a parent roll 30 of large width BM,
Cutting of the parent roll 30 into narrow rolls 32 of smaller width B, whereby the laminate coated with the adhesive coating 3 is guided from the parent roll over a separating device 22, separated there and the adhesive tape 1 is wound onto the narrow rolls 32.

The last method step is illustrated here by FIG. 6.

For narrow-roll manufacturing it is also provided that at least, in particular, one cutting device 22 for cutting the substrate material 2 provided with the adhesive coating 3 into strips, said strips extending in the tape longitudinal direction X, is disposed between the wide roll 30 and the narrow rolls 32. These strips respectively form the adhesive tapes 1. In the blade cut shown, a fixed blade 27 is plunged, at least on one side, into the passing substrate material 2 provided with the adhesive coating 3.

At least one zigzag blade 20 for producing the tape edges 10 of the adhesive tape 1 is used in the separating device 22.

The strips can in particular be advantageously separated by the separate narrow rolls being alternatingly disposed on different shafts 34, 36, wherein the narrow rolls 32 are driven in the same direction by their associated shafts 34, 36. On each shaft 34, 36 here at least two narrow rolls 32, preferably a plurality of narrow rolls 32, are disposed, wherein the shafts 34, 36 can be driven in particular at the same rotational speed, advantageously by a single, for example electric-motor drive.

The adhesive tapes 1 so manufactured and wound on narrow rolls 32 usually have width B in the range from 9 mm to 50 mm, and lengths in the range from 1 m to 100 m, preferably from 2 m to 50 m. The parent- or output-rolls 30, from which the individual adhesive tapes 1 are cut, usually have widths in the range from 500 mm to 2000 mm and lengths in the range from 300 m to 10,000 m. In particular the roll lengths are strongly material-dependent. Since the roll diameter is often subject to technical limitations, longer rolls 30 can be manufactured with thin substrate materials than with thick materials.

As is already apparent from the above, the invention is not limited to the exemplary embodiments shown and described, but rather also comprises all embodiments which work the same way in the sense of the invention. For example, instead of a zigzag-shaped pattern of the edge 10 a continuous wave-like pattern could be chosen, or a pattern having a Y-shape, or a blade with so-called T-notches, which have a targeted edge breach in the millimeter range, without being outside the context of the invention.

The cutting into narrow rolls can also be effected in a known manner, depending on the material and the thickness of the adhesive tape 1, by crush-cut, shear-cut, by using a laser, by an ultrasound blade, or with a water jet. With crush-cutting, the cutting device 22 is one wherein a circular blade works against a roller. With shear-cutting, a circular blade plunges into a lower blade. With these cutting types deviating from the described strip cutting, it is also possible to produce at least one tape edge 10 in the form of a pattern deviating from a straight line, i.e. to structure in a manner favorable to tearing using the separating process.

In the exemplary embodiment according to Table 3, in the fabrics of the first textile layer 4 and/or in the fabrics of the second textile layer 5 the warp threads 7 and the weft threads 8 are also, for example, respectively designed differently, which in the described combination positively influences the inventively sought advantageous combination of high abrasion resistance, noise damping, and hand-tearability, but which do not have to be present in this manner in every case.

Furthermore it is preferably possible—as also indicated in Table 3—to both manufacture the substrate 2 from a solution-dyed yarn or thread material and to subject the substrate 2 to a dispersion dyeing. Here, preferred color combinations generated by the use of suitable pigments—preferably in polyester material—in the textile layers 4, 5 of an inventive adhesive tape 1 are black/black, black/white, and white/white. The textile fabric layers 4, 5 can also respectively have the same or different colors.

Optionally the titer of the threads 7, 8 and thus also of the width-B-related thread thickness (fineness) of the warp threads 7 and/or the length-L-related thread thickness (fineness) of the weft threads 8—respectively determined by multiplication of the respective thread count per length unit by the respective titer of the threads 7, 8—can deviate from the values given in Table 3.

The person skilled in the art can also supplement the invention by further advantageous technical measures without leaving the context of the invention. Thus, for example, a calendaring of the substrate 2 or of the first textile layer 4 and/or of the second textile layer 5 prior to its lamination promotes a reduction of the permeability of the fabric for the adhesive in the adhesive layer 3 and/or in the adhesive connection layer 6. This is expressed by the fact that the air permeability of the fabric, measured according to DIN ISO 9237 with a test pressure of 500 Pa can preferably be smaller than 200 l/m$^2$s. Specifically, it may for example be approximately 100 l/m$^2$s, and when measured under a test pressure of 200 Pa, it can preferably be less than 100 l/m$^2$s, and specifically lie at approximately 50 l/m$^2$s. Even with possible lower viscosity of the adhesive during the application of the adhesive, a penetration of the adhesive through the substrate 2 does not result.

Furthermore, the invention is not limited to the combinations of features defined in the independent claims 1 and 28, but rather can also be defined by any other combination of specific features of all of the individual features disclosed. This means that in principle practically any individual feature of the independent claims can be removed or replaced by another individual feature disclosed elsewhere in the application.

The invention claimed is:
1. Highly abrasion-resistant technical adhesive tape which can be rolled into an adhesive tape roll, comprising
   a strip-shaped double-layer substrate with
   a pressure-sensitive adhesive coating on one side,
   a first textile layer composed of a woven fabric with warp and weft threads and
   a second textile layer composed of a woven fabric with warp and weft threads,
   the first and second textile layers being firmly connected to each other over the entire surface by an adhesive connection layer,
   wherein the woven fabric of the first textile layer and the woven fabric of the second textile layer each have a basis weight in the range from 50 g/m$^2$ to 300 g/m$^2$,
   wherein the adhesive connection layer has a basis weight in the range from 50 g/m$^2$ to 300 g/m$^2$, and
   wherein the adhesive tape has a thickness of at least 0.50 mm and one or more zigzag-shaped tape edges, wherein each of the one or more zigzag-shaped edges is formed as a tooth pattern that deviates from a straight line and consists of tooth tips, tooth flanks, and tooth feet in the absence of a slit or incision, defined by a tooth height located between the tooth tips and the tooth feet that is in the range of 0.1 mm to 3.0 mm, a tooth tip angle that is in the range of 42° to 70°, and a tooth foot width that falls within the same range as the tooth height,
   wherein the tooth pattern is structured using a separating process, such that outer warp threads of the first and second textile layers lying in a vicinity of the tape edge are cut by the separating process in a region of the tooth flanks and at least scribed in a region of the tooth feet, wherein a number of thereby weakened warp threads on each edge falls in the range of 1 to 15, wherein all of the warp threads of the first and second textile layers lying outside of the region of the tooth flanks and the region of the tooth feet are continuous across a plurality of the tooth feet,
   wherein in the woven fabric of the first textile layer and/or in the woven fabric of the second textile layer respectively, the warp threads have a linear density in the range from 30 dtex to 110 dtex,
   wherein in the woven fabric of the first textile layer and/or in the woven fabric of the second textile layer the warp threads and weft threads are each structured differently, wherein the linear density of the warp threads to a linear density of the weft threads is in a ratio of 1:8-11,
   wherein the adhesive tape has a tensile strength in the range from 50 N/cm to 300 N/cm in a test according to

DIN EN 14410, and wherein the tear propagation according to the Elmendorf test is smaller than 15,000 mN.

2. The adhesive tape according to claim 1, wherein both tape edges are formed as zigzag cut edges, which are described by a tooth pattern having tooth tips, the tooth flanks, and the tooth feet.

3. The adhesive tape according to claim 2, wherein the tooth height between the tooth tips and the tooth feet falls in the range from 0.5 mm to 2.0 mm.

4. The adhesive according to claim 2, wherein the number of the outer warp threads lying in the vicinity of the tape edge which have been weakened by the separating process on each edge falls in the range of 2 to 12.

5. The adhesive tape according to claim 1, wherein the woven fabric of the second textile fabric layer is the same fabric as the woven fabric of the first textile fabric layer.

6. The adhesive tape according to claim 1, wherein the woven fabric of at least one of the first textile layer and the second textile layer has a basis weight in the range of 110 g/m2 to 200 g/m2.

7. The adhesive tape according to claim 1, wherein the woven fabric of at least one of the first textile layer and the second textile layer is formed from polyester fibers composed of polyethylene terephthalate.

8. The adhesive tape according to claim 1, wherein the adhesive connection layer has a basis weight in the range of 55 g/m2 to 150 g/m2.

9. The adhesive tape according to claim 1, wherein the adhesive connection layer is composed of a hot-melt adhesive predominantly containing an ethyl acrylate copolymer or an ethylene-vinyl acetate copolymer.

10. The adhesive tape according to claim 1, wherein a laminate adhesion force, determined according to DIN EN 1939, between the first textile layer and the second textile later of the substrate is greater than 10 N/cm.

11. The adhesive tape according to claim 1, wherein the adhesive coating is composed of an acrylate or acetate adhesive, which is identical to a hot-melt adhesive forming the adhesive connection layer.

12. The adhesive tape according to claim 1, wherein the adhesive coating has a basis weight in the range of approximately 50 g/m2 to 300 g/m2.

13. The adhesive tape according to claim 1, comprising a thickness in the range from 0.50 mm to 1.0 mm.

14. The adhesive tape according to claim 1, comprising an adhesive force on steel in the range from 4.5 N/cm to 15.0 N/cm in a test according to DIN EN 1939.

15. The adhesive tape according to claim 1, comprising an adhesive force on the tape back in the range from 4.0 N/cm to 15.0 N/cm in a test according to DIN EN 1939.

16. The adhesive tape according to claim 1, comprising an unwinding force in the range from 2 N to 15 N in a test according to DIN EN 1944 and by a transverse tearability according to LV 312.

17. The adhesive tape according to claim 1, comprising an elongation at break that is at least 20 percent in a test according to DIN EN 14410.

18. The adhesive tape according to claim 1, comprising an abrasion resistance according to LV 312 of at least class E in the range from 5,500 to 10,000 strokes as determined on a 5 mm mandrel.

19. The adhesive tape according to claim 1, comprising a noise damping according to LV 312 of at least class B according to LV 312.

20. The adhesive tape according to claim 1, wherein in the woven fabric of the first textile layer and/or in the woven fabric of the second textile layer the linear density of the warp threads to the linear density of the weft threads is in a ratio of 1:10.

21. The adhesive tape according to claim 1, wherein in the woven fabric of the first textile layer and/or in the woven fabric of the second textile layer the warp threads respectively have a linear density in the range from 50 dtex to 76 dtex.

22. The adhesive tape according to claim 1, wherein in the woven fabric of the first textile layer and/or in the woven fabric of the second textile layer the weft threads respectively have a linear density in the range from 110 dtex to 1,000 dtex.

23. The adhesive tape according to claim 1, wherein in the woven fabric of the first textile layer and/or in the woven fabric of the second textile layer the warp threads and/or the weft threads are respectively composed of a number of filaments in the range from 12 to 240 filaments.

24. The adhesive tape according to claim 1, wherein the woven fabric of at least one of the first textile layer and the second textile layer comprises 42-48 warp threads and 21-25 weft threads.

25. The adhesive tape according to claim 1, wherein in the woven fabric of at least one of the first textile layer and the second textile layer, at least the warp threads or the weft threads are intermingled, with 50 to 150 intermingling points per meter.

26. The adhesive tape according to claim 1, wherein the woven fabric of at least one of the first textile layer and the second textile layer, each of the weft threads are formed from a combination of filaments of different yarn forms.

27. A method for manufacturing an adhesive tape, comprising the following method steps:
   manufacturing a strip-shaped double-layer substrate by laminating a woven fabric of a first textile layer and a woven fabric of a second textile layer into a laminate using an adhesive connection layer, the woven fabric of the first textile layer and the woven fabric of the second textile layer each having warp and weft threads, as well as a basis weight in the range from 50 g/m$^2$ to 300 g/m$^2$, wherein in the woven fabric of the first textile layer and/or in the woven fabric of the second textile layer respectively, warp threads have a linear density in the range from 30 dtex to 110 dtex, wherein in the woven fabric of the first textile layer and/or in the woven fabric of the second textile layer the warp threads and weft threads are each structured differently, wherein the linear density of the warp threads to a linear density of the weft threads is in a ratio of 1:8-11, and the adhesive connection layer having a basis weight in the range from 50 g/m$^2$ to 300 g/m$^2$,
   applying a pressure-sensitive adhesive coating to at least one side of the laminate,
   winding the laminate onto a parent roll of large width,
   cutting the laminate from the large width of the parent roll (30) into the adhesive tape wound onto narrow rolls of smaller width by guiding the laminate coated with the adhesive coating from the parent roll over a separating device, and
   winding the adhesive tape onto the narrow rolls,
   wherein the separating device includes at least one zigzag blade for producing zigzag-shaped tape edges of the adhesive tape that shapes one or more tape edges into a zigzag-shaped edge, each zigzag-shaped edge formed as a tooth pattern that deviates from a straight line and consists of tooth tips, tooth flanks, and tooth feet in the absence of a slit or incision, defined by a tooth height located between the tooth tips and the tooth feet that is in the range of 0.1 mm to 3.0 mm, a tooth tip angle that is in the range of 42° to 70°, and a tooth foot width that falls within the same range as the tooth height, wherein the adhesive tape has a thickness of at least 0.50 mm, wherein outer warp threads of the first and second textile layers lying in a vicinity of the tape edge are cut by a separating process in a region of the tooth flanks and at least scribed in a region of the tooth feet, wherein a number of thereby weakened warp threads on each edge falls in the range of 1 to 15, and wherein all of the warp threads of the first and second textile layers lying inward from the tooth feet are continuous along a plurality of tooth feet, wherein the adhesive tape has a tensile strength in the range from 50 N/cm to 300 N/cm in a test according to DIN EN 14410, and wherein the tear propagation according to the Elmendorf test is smaller than 15,000 mN.

28. The method according to claim 27, wherein the adhesive in at least one of the adhesive connection layer and the adhesive coating is applied in a pressureless coating method, wherein the adhesive respectively falls as a closed film onto the first textile layer or the second textile layer.

29. The method according to claim 27, for manufacturing the substrate, wherein a fabric having a basis weight in the range of 110 g/m2 to 200 g/m2 is used as the fabric of at least one of the first textile layer and the second textile layer.

30. The method according to claim 27, wherein at least one of the adhesive coating and the adhesive connecting layer has a basis weight in the range of 55 g/m2 to 150 g/m2.

31. The method according to claim 27, wherein the zigzag blade in the cutting device includes teeth having a tooth height in the range from 0.1 mm to 3.0 mm with microserrations having a tooth height in the range from 0.1 mm to less than 1.0 mm macroserrations having a tooth height in the range from 1.0 mm to 3.0 mm are present.

* * * * *